United States Patent [19]

Heintz

[11] Patent Number: 4,947,950
[45] Date of Patent: Aug. 14, 1990

[54] VEHICLE SPEED CONTROL DEVICE

[75] Inventor: Richard P. Heintz, Kalamazoo, Mich.

[73] Assignee: The Deaccelerator Corporation, Kalamazoo, Mich.

[21] Appl. No.: 309,274

[22] Filed: Feb. 10, 1989

[51] Int. Cl.$^5$ ............................................. B60K 31/10
[52] U.S. Cl. ................................... 180/176; 123/350; 123/360; 123/378; 123/396; 180/178
[58] Field of Search ............... 180/175, 176, 177, 178, 180/170; 123/350, 378, 396, 401, 360

[56] References Cited

U.S. PATENT DOCUMENTS

| | | | |
|---|---|---|---|
| 2,519,859 | 8/1950 | Teetor | 375/178 |
| 2,837,060 | 6/1958 | Teetor | 91/366 |
| 2,916,100 | 12/1959 | Teetor | 180/174 |
| 2,973,051 | 2/1961 | Teetor | 180/174 |
| 3,086,608 | 4/1963 | Marie | 180/82.1 |
| 3,090,460 | 5/1963 | Teetor | 180/174 |
| 3,547,216 | 12/1970 | Marie | 180/178 |
| 3,708,031 | 1/1973 | Jania et al. | 180/178 |
| 4,099,592 | 7/1978 | Gonzales | 180/176 |
| 4,337,743 | 7/1982 | Mattson | 123/396 |
| 4,590,909 | 5/1986 | Heintz | 180/176 |
| 4,776,420 | 10/1988 | Siebert et al. | 180/178 |
| 4,834,044 | 5/1989 | Maas | 123/401 |

FOREIGN PATENT DOCUMENTS 2315077 10/1974 Fed. Rep. of Germany ...... 180/178

Primary Examiner—Charles A. Marmor
Assistant Examiner—Eric Culbreth
Attorney, Agent, or Firm—Flynn, Thiel, Boutell & Tanis

[57] ABSTRACT

A vehicle speed control device in a vehicle having a variable speed engine and drive train arrangement connecting the engine to a drive wheel therefore includes a foot pedal movable in first and second directions, a vehicle speed transducer arrangement for generating a signal in response to vehicle speeds in excess of a predetermined speed and a control arrangement for varying the value of the predetermined speed. A throttle arrangement is responsive to movement of the foot pedal in the first direction for increasing the vehicle speed and is responsive to movement of the foot pedal in the second direction for decreasing the vehicle speed. A coupling arrangement transfers movement of a movable actuator to the foot pedal, to move the foot pedal in the first and second directions. A regulating arrangement is responsive to the signal of the speed transducer arrangement for regulating the vehicle speed at or just below the predetermined speed. The regulating arrangement includes a first drive arrangement for urging the actuator and linked foot pedal in the first direction and a second drive arrangement for urging the actuator and linked foot pedal in the second direction. An arrangement for selectively uncoupling the foot pedal from the actuator is provided.

9 Claims, 2 Drawing Sheets

1

VEHICLE SPEED CONTROL DEVICE

FIELD OF THE INVENTION

This invention relates to a device for maintaining the speed of a vehicle at a selected value through the application by the operator of a steady force to the accelerator pedal and, more particularly, to a speed control device which can also maintain the vehicle speed at a selected value without the application of a steady force to the accelerator pedal by the operator.

BACKGROUND OF THE INVENTION

The standard cruise control is a device that allows the motor of a vehicle to maintain a constant preselected vehicle speed without requiring the operator to depress the accelerator pedal. By automatically depressing the accelerator pedal to maintain a preselected velocity, cruise control eliminates the leg fatigue that can accompany sustained highway travel. This leg fatigue usually centers around the ankle and is the result of the varying amounts of accelerator pedal depression required of the motorist to maintain a fairly constant vehicle speed.

U.S. Pat. No. 4,590,909, assigned to the assignee of the present invention, discloses a known speed control device known by the trademark "Deaccelerator". That device, like conventional cruise control, eliminates the ankle fatigue often accompanying sustained travel. When operating a motor vehicle not equipped with a speed control device, motorists generally rest the heel of the foot on the floor while the rest of the foot is in full contact with the accelerator pedal. Varying amounts of accelerator pedal depression are required of the motorist to maintain a constant speed when encountering varying road gradients and changing wind conditions. The motorist must operate the accelerator pedal by foot movements pivotal at the ankle. In the invention of U.S. Pat. No. 4,590,909, the heel of the motorists foot need not rest on the floor during accelerator pedal operation. Instead, the motorist has the option of placing the foot, including the heel, on the accelerator pedal so that the accelerator pedal literally functions to support the foot. If a motorist attempted this in a vehicle not equipped with the Deaccelerator, the weight of the foot would provide a force greater than the counterforce provided by the four pound return spring of the accelerator pedal. The accelerator pedal would become almost completely depressed, and the speed of the vehicle would become far too great. If a motorist's foot is placed on the accelerator pedal of a vehicle equipped with the invention of U.S. Pat. No. 4,590,909, the weight of the motorist's foot will depress the accelerator pedal only far enough to maintain the selected velocity. As the vehicle moves uphill, the weight of the motorists foot will further depress the accelerator pedal to the new position required to maintain the selected velocity. As the vehicle moves downhill, the Deaccelerator will automatically move the accelerator pedal, with the motorist's foot upon it, toward an extended position to maintain the selected velocity. Thus, the prior invention eliminates ankle fatigue by automatically maintaining a preselected velocity, but, unlike cruise control, achieves speed control in conjunction with driver participation.

According to the invention of U.S. Pat. No. 4,590,909, the accelerator pedal resists further depression when a vehicle speed reaches a predetermined speed, such as the maximum legal speed limit. However, this accelerator pedal resistance may be overridden if the motorist depresses the accelerator pedal with sufficient force. When the accelerator pedal resistance is overridden, the vehicle will accelerate. When this occurs, increasing accelerator pedal resistance is imposed as a function of increases in vehicle speed.

Thus, the Deaccelerator provided speed control in conjunction with driver participation, and provided increased accelerator pedal resistance when the motorist attempted to override the speed control. If the motorist's foot is removed from the accelerator pedal, the return spring will tend to move the accelerator pedal upward, reducing the vehicle speed.

Many motorists do not like to use cruise control when there is any other traffic around, because there is a certain amount of planning ahead required that is not natural for them to do. Also, when not using cruise control, most motorists are accustomed to the often-rehearsed lateral movement of the foot when going from the accelerator pedal to the brake pedal. An increase in reaction time regarding the execution of a braking response may occur when a motorist is using cruise control because the typical lateral response is no longer effective and the placement of the motorists foot varies and must be determined each time a braking response is to be executed. The conventional Deaccelerator allows the driver to rest his or her foot on the accelerator pedal and travel at a preset speed, such as the speed limit, and is thus effective for use in heavy traffic situations. Also, the operator need only remove his or her foot from the accelerator pedal and, as in normal driving, the pedal return spring will begin to extend the pedal and slow the vehicle.

However, most heavy traffic situations are encountered on busy city streets which have a speed limit somewhat lower than the maximum legal speed. Because the Deaccelerator was originally designed to control vehicle speeds in a small range around the maximum legal speed, the cruise control function was of little use in most heavy traffic, lower speed situations. Similarly, the increased pedal resistance encountered in attempts to override the speed control mechanism was set to be engaged at the maximum legal speed limit. Thus, the Deaccelerator could not be used effectively as a vehicle speed limiting device in city driving.

In addition to the above-described dangers encountered when using conventional cruise control in heavy traffic, the conventional cruise control mechanism, such as that marketed under the trademark "Supercruise" by Dana Corporation, exhibits the following operating characteristics. If there is a malfunction, the driver must depress the brake pedal to disengage the cruise control. This removes battery power from the cruise control circuitry, and is supposed to disengage the cruise control. However, not all failures are circumvented when battery power is removed. For instance, a solenoid valve can become stuck. More specifically, the vacuum solenoid can fail to close. The solution to this problem is the use of another solenoid valve, which is powered directly by the brake pedal switch. This is an oversized unit, which will dump vacuum from the actuator even if the vacuum solenoid fails to close. One problem with this approach is that the brake pedal actuated solenoid valve can fail closed at any time with no indication of this failure until the vacuum solenoid fails to close as above. In such an instance, the vehicle will begin to overspeed, and pressing the brake pedal will not disengage the cruise control. The driver is expected to have the presence of mind to turn off the ignition.

Such hidden failures in conventional cruise control operation can be eliminated by adapting the Deaccelerator to incorporate the conventional cruise control function The adaptation is accomplished by replacing the force supplied by the driver's foot so that the Deaccelerator functions without driver participation, just as conventional cruise control systems.

Accordingly, it is an object of the present invention to provide a vehicle speed control system which eliminates hidden failure modes.

A further object of the invention is to provide a vehicle speed control system, as aforesaid, which can always be completely disengaged by disconnecting it from the vehicle battery.

A further object of the invention is to provide a vehicle speed control system, as aforesaid, which supplies, as an option, a device that replaces the function of the motorist's foot in the conventional Deaccelerator.

A further object of the present invention is to provide a Deaccelerator in which the cruising speed can be conveniently selected by the motorist.

A further object of the invention is to provide a Deaccelerator in which driver participation can be selectively obviated.

A further object of the invention is to provide a Deaccelerator in which a maximum limit on speed control settings can be conveniently selected by the operator.

A further object of the invention is to provide a speed maintaining device, as aforesaid, the components of which are of durable construction and easy maintenance.

SUMMARY OF THE INVENTION

The objects and purposes of the invention are met by providing a vehicle speed control device in a vehicle having a variable speed engine and a drive train arrangement connecting the engine to a drive wheel therefor. The device includes a foot pedal movable in first and second directions. A vehicle speed transducer arrangement is provided which is responsive to vehicle speed for generating a signal in response to vehicle speeds in excess of a predetermined speed. The vehicle speed transducer arrangement includes a manually adjustable control arrangement for allowing the predetermined speed parameter to be varied between selectable values. A throttle arrangement is provided which is responsive to movement of the foot pedal in the first direction to increase vehicle speed and which is responsive to movement of the foot pedal in the second direction to decrease vehicle speed. An actuator housing is provided having an actuator movable therein. A coupling arrangement is included for transferring movement of the movable actuator to the foot pedal so that the actuator is movable in the housing to effect movement of the foot pedal in the first and second directions. A regulating arrangement is responsive to the signal of the vehicle speed transducer arrangement for regulating the speed of the vehicle within a range of speeds at or just below the predetermined speed. The regulating arrangement includes a first drive arrangement which is responsive to the vehicle speed transducer arrangement at vehicle speeds less than the predetermined speed for urging the actuator and linked foot pedal in the first direction. The regulating arrangement further includes a second drive arrangement responsive to the vehicle speed transducer arrangement at vehicle speeds in excess of the predetermined speed for urging the actuator and linked foot pedal in the second direction. An arrangement for selectively uncoupling the foot pedal from the actuator is also provided.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
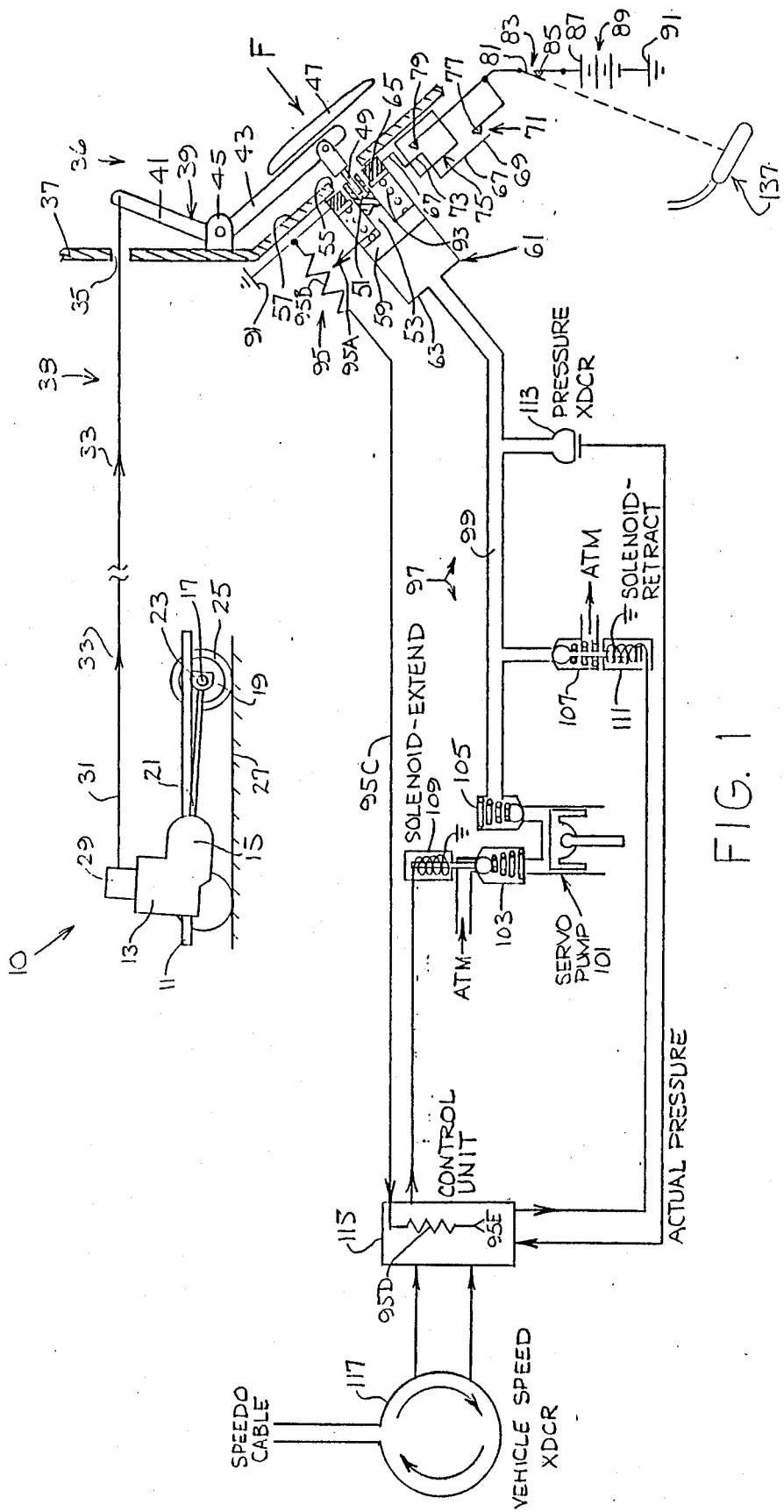
FIG. 1 is a schematic illustration of the inventive device embodying the invention.

FIG. 1 illustrates in schematic form the general concept of the invention as it is applied to an internal combustion engine powered vehicle, such as an automobile 10. The automobile 10 includes a frame 11 on which is mounted an engine 13, a transmission 15 and an axle 17. At least one drive wheel 19 is mounted on the axle 17. Power generated by the engine 13 is delivered by the transmission 15 to a drive shaft 21. The drive shaft 21 is linked to a differential gear 23 which applies the power from the engine 13 to the axle 17 causing the drive wheel 19 to rotate. Friction between a tire 25 on the rotating drive wheel 19 and the driving surface 27 causes the automobile 10 to move relative to the driving surface 27. The velocity at which the automobile 10 moves is determined by the rate at which the drive wheel 19 rotates. The rotation rate of the drive wheel 19 is in turn determined by the speed at which the engine 13 runs. The speed at which the engine 13 runs is determined by the nature of the fuel-air mixture in a carburetor 29 on the engine 13. The fuel-air mixture in the carburetor 29 is varied by means of a throttle cable 31. A pulling on the throttle cable 31 in the direction of the arrow 33 will generally cause a larger proportion of fuel to be present in the fuel-air mixture in the carburetor 29. As the proportion of fuel in the fuel-air mixture in the carburetor 29 is increased, the speed of the engine 13 is proportionally increased, thereby causing the rotational rate of the drive wheel 19 to increase thus causing the automobile 10 to move at an increased velocity. A movement of the cable 31 in the direction opposite the arrow 33 will generally cause the proportion of fuel in the fuel-air mixture in the carburetor 29 to decrease causing the engine speed to decrease, thereby causing the rotational rate of the drive wheel 19 to decrease thus causing a decrease in the velocity of the automobile 10.

The throttle cable 31 extends from the carburetor 29 through an opening 35 in a fire wall 37, which fire wall extends generally vertically between a passenger compartment 36 and an engine compartment 38. The throttle cable 1 is connected to a lever arm 39. The lever arm 39 consists, in this embodiment, of two arms 41 and 43 and is pivotally mounted between the two arms on a bracket 45 fastened to the fire wall 37. The free end of the arm 41 is connected to the throttle cable 31 and the free end of the arm 43 is connected to an accelerator pedal 47. A linkage arm 49 is, in this particular embodiment, pivotally secured to the accelerator pedal 47 and the arm 43 of the lever arm 39. The linkage arm 49 is received in a recess 1 of a piston rod 53, which piston rod and linkage arm project through an opening 55 in a floorboard 57. The floorboard 57 extends generally at an angle to join with the fire wall 37. The piston rod 53 is fastened to an actuator piston 59 which is slidably mounted in a cylinder 61 which extends from the opening 55 in the floorboard 57 away from the floorboard 57 to a closed end 63. It will be noted that if the accelerator pedal 47 is moved in the direction of the force F, the linkage arm 49 will bottom out in the recess 51 to urge the actuator piston 59 toward the closed end 63 of the cylinder 61.

A conductive coil 65 is located adjacent the opening 55 in the floorboard 57 such that it maintains a surrounding relationship with the linkage arm 49. One end of the coil 65 is connected by a conductor 67 to one contact 73 of a reed switch 75 and to one contact 69 of a normally open momentary contact switch 71. The other contact 77 of the momentary contact switch 71 is connected to the other contact 79 of the reed switch 75, which contacts 77 and 79 are connected to a contact 81 of a normally closed current switch 83. The other contact 85 of the normally closed current switch 83 is connected to the positive terminal 87 of the automobile battery 89. The conductive coil 65 is connected at its other end to the negative terminal 91 (shown as frame ground) of the battery 89.

A compression spring 93 is disposed within the cylinder 61 and extends between the actuator piston 59 and a surface adjacent the coil 65 for urging the actuator piston 59 toward the closed end 63 of the cylinder. A pedal position sensor 95 attached to the piston rod 53 provides an electrical signal to indicate the actual position of the actuator piston 59 in the cylinder 61. The use of the spring 93 and pedal position sensor 95 will be more fully described below The cylinder 61 is connected at its closed end 63 to a pressure supply unit 97. The pressure supply unit includes a pressure chamber 99, a servo pump 101, check valves 103, 105 and 107, and solenoids 109 and 111. A pressure transducer 113 provides an electrical signal representing the pressure in the pressure chamber 99 to a control unit 115. The control unit 115 responds to electrical signals from the pressure transducer 113, the pedal position sensor 95, and a vehicle speed transducer 117, which is connected to a speedometer cable, to cause the pressure supply unit 97 to adjust the pressure in the pressure chamber 99 and the cylinder 61 so that the actuator piston 59 coacts with the force F applied to the accelerator pedal 47 by the weight of the operator's foot to maintain an appropriate pedal position and thereby maintain a predetermined vehicle speed. The vehicle speed transducer 117 and the pressure supply unit 97 are preferably substantially identical to that disclosed in U.S. Pat. No. 4,590,909, the disclosure of which is incorporated herein by reference. It will be recognized, however, that other arrangements could be utilized.

The pedal position sensor 95 is also preferably identical to that disclosed in U.S. Pat. No. 4,590,909, which provides the basis for the following discussion. The pedal position sensor 95 is a potentiometer with its wiper 95A attached to the piston rod 53 and thereby electrically attached to frame ground 91. The resistive element 95B of the pedal position sensor 95 is connected to the control unit 115 by a connecting line 95C. Within the control unit 115, the connecting line 95C is connected through a resistor 95D to a reference voltage 95E. Thus, as the actuator piston 59 moves from the closed end 63 of the cylinder 61 toward the floor board 57 and the accelerator pedal 47 correspondingly moves from a position of complete depression toward complete extension, the voltage on the connecting line 95C rises from zero volts to some fraction of the reference voltage 95E by the voltage divider action of the resistances 95B and 95D. Thus the pedal position sensor 95 provides the control unit 115 with a signal representing the position of the accelerator pedal 47. It will be noted that the free end of the resistive element 95B may be left open. In this embodiment, however, the free end of the resistive element 95B is connected to the frame ground 91. The resistor 95D was designated R15 in FIG. 13 of U.S. Pat. No. 4,590,909.

Figure 2:
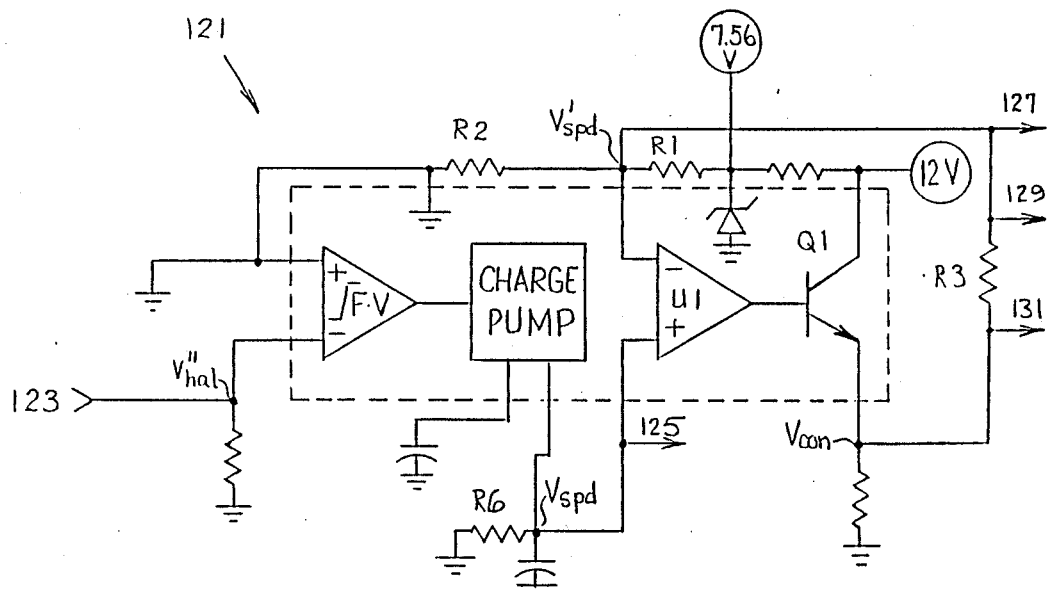
FIG. 2 is an electrical schematic diagram of a portion of a prior art device.

The control unit 115 is an improvement to a prior art control unit disclosed in U.S. Pat. No. 4,590,909. FIG. 2 shows the frequency-to-voltage converter arrangement 121 of the prior art control unit. The nodes corresponding to $V''_{hal}$, $V_{con}$, $V_{spd}$ and $V'_{spd}$ in the prior art unit are labeled in FIG. 2. The nodes 123, 125 and 127 in FIG. 2 are connected to C2, R27 and R10, respectively, of FIG. 13 in the prior art control unit. Nodes 129 and 131 are connected to opposite ends of C6 in the prior art unit. $V_{spd}$ is the output of the charge pump and is proportional to the speed of the vehicle. $V_{spd}$ is applied to the non-inverting junction of the operational amplifier U1. The voltage on the inverting junction of operational amplifier U1, $V'_{spd}$, is kept at an initial, or nominal, 2.8 volts by the action of the 7.56 volt reference voltage acting through R1 and R2. The action of U1 is to make $V_{con}$ vary as a function of $V_{spd}$ by the feedback effect of $V'_{con\ acting\ through\ R3\ on\ V'spd}$ so as to keep $V'_{spd}$ equal to $V_{spd}$. When $V_{spd}$ rises above 2.8 volts, so that $V'_{spd}$ is less than $V'_{spd}$ the reaction of U1 is to raise its output, thus raising the level of $V_{con}$. Q1 is simply used to boost the output current capability of U1, and will not be referred to further. The action of $V_{con}$ through R3 causes $V'_{spd}$ to rise as $V_{con}$ rises. This continues until $V'_{spd}$ is again equal to $V_{spd}$, so that an equilibrium is reached.

Figure 3:
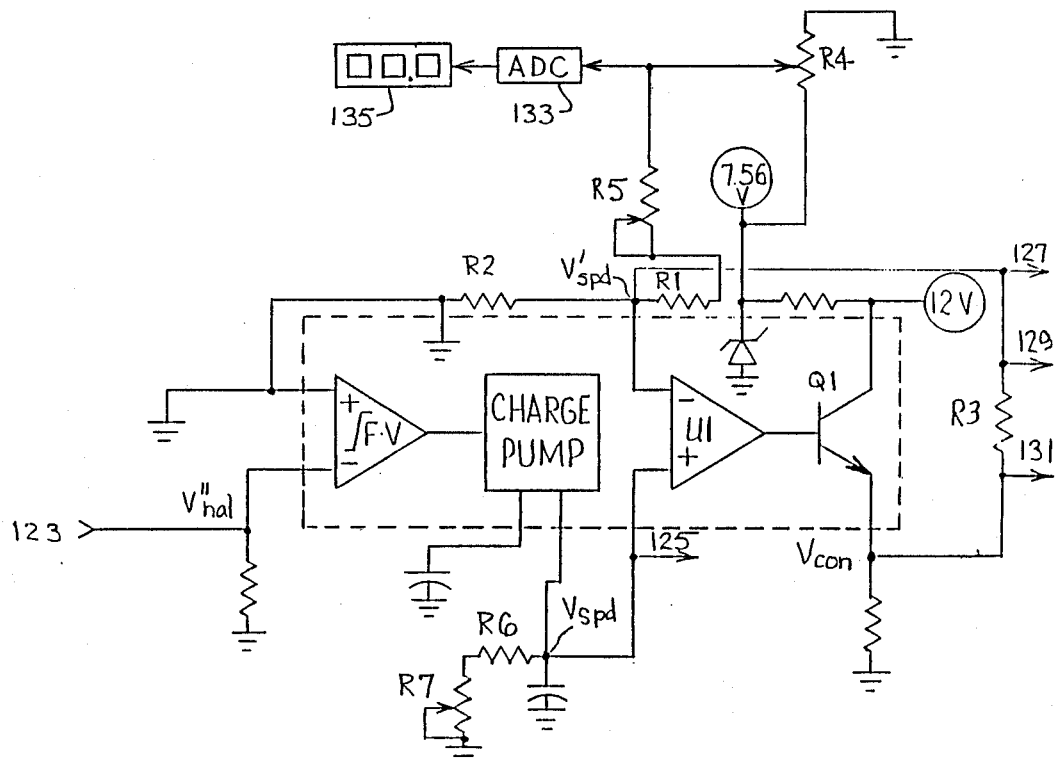
FIG. 3 is an electrical schematic diagram generally similar to FIG. 2, but including inventive features of the present invention.

$V_{con}$ is the signal which is used to actuate the solenoids 109 and 111 of FIG. 1 to adjust the pressure in the chamber 99 and thereby control the position of the actuator piston 59 and accelerator pedal 47 to thus control the speed of the vehicle. Therefore, the speed at which the speed control feature is engaged is dependent upon $V_{con}$, which remains nominally at 0 volts until such time as $V_{spd}$, the voltage proportional to the vehicle speed, exceeds the nominal value of $V'_{spd}$ and thereby causes $V_{con}$ to begin to increase by the action of U1. Thus, if the nominal voltage of $V'_{spd}$ is reduced, $V_{con}$ will begin to increase at lower values of $V_{spd}$, that is, at lower vehicle speeds. The nominal value of $V'_{spd}$ is determined by the action of the 7.56 volt reference voltage acting through R1 and R2. Therefore, if R1 is increased, the corresponding nominal voltage of $V'_{spd}$ will decrease. Accordingly, in FIG. 3, a control knob potentiometer R4 is inserted between the 7.56 volt reference voltage and R1. This allows the nominal voltage at $V'_{spd}$ to be adjusted below the maximum and therefore allows the speed control feature of the prior art device to be engaged at lower vehicle speeds. The wiper of the potentiometer R4 is connected to an analog-to-digital convertor 133 which converts the voltage level of the wiper to a digital signal which is then applied to a digital display 135 so that the adjustment accomplished by potentiometer R4 can be displayed to the operator. A calibration potentiometer R5 is included between the wiper of potentiometer R4 and R1 to allow the voltage level at $V'_{spd}$ to be varied without changing the value on the digital display. This allows the cooperative system comprising the control knob potentiometer R4, the analog-to-digital convertor 133 and the digital display 135 to be calibrated to correspond to a speedometer speed or a measured actual speed. The calibration potentiometer R5 is, in one embodiment, operable by inserting a small screw driver into a hole under the control knob potentiometer.

Referring to prior art FIG. 2, the calibration of voltage $V_{spd}$ is determined by R6. That is, R6 determines the number of miles per hour represented by each volt of $V_{spd}$. Thus, according to the above discussion, if $V_{spd}$ is calibrated such that its voltage to speed ratio is higher than the nominal value, the speed at which $V_{spd}$ reaches the nominal voltage of $V'_{spd}$, and thus triggers the increase of $V_{con}$, is lowered. Therefore, and referring to FIG. 3, a potentiometer R7 has been included between R6 and ground to allow adjustment of the calibration of $V_{spd}$. As the calibration resistance is increased from the nominal value of R6 using potentiometer R7, the voltage to speed ratio of $V_{spd}$ is increased so that $V_{spd}$ reaches the nominal value of $V'_{spd}$ at a lower speed than the maximum legal speed limit. $V_{con}$ therefore begins to increase at this lower speed and therefore the speed control function of the prior art device is engaged at a lower speed. Thus, the lower speed becomes the new limit speed at which the pedal resistance feature of the Deaccelerator is engaged and beyond which the Deaccelerator cruise control cannot be engaged. With the new calibration of $V_{spd}$, the control knob potentiometer R4 can be adjusted to lower the nominal voltage of $V'_{spd}$ and therefore engage the speed control device at a still lower vehicle speed. Thus, lower maximum cruise control speeds may be selected using potentiometer R7 to adjust the level of $V_{spd}$, and speeds lower than the adjusted maximum speed may be selected using the control knob potentiometer R4 to adjust the level of $V'_{spd}$.

OPERATION

The cruise control feature of the present invention is an adaptation of the conventional cruise control operation (wherein no driver participation is required to maintain the desired speed) to the structure of the Deaccelerator of U.S. Pat. No. 4,590,909. In the conventional Deaccelerator cruise control system, which will now be described referring to FIG. 1, when the vehicle has reached a speed within a narrow range below the preselected cruise speed, the control unit 115 reacts to signals from the vehicle speed transducer 117, the pedal position sensor 95 and the pressure transducer 113 to cause the pressure supply unit 97 to increase the pressure in the pressure chamber 99 so as to move the actuator piston 59 in the cylinder 61 in a direction away from the closed end 63. The recess 51 in the piston rod 53 engages the linking arm 49 so that the linking arm is bottomed in the piston rod. In this position, the force F exerted by the weight of the driver's foot and the force supplied by the pressure supply unit 97 cooperate to maintain the accelerator pedal 47 in an appropriate position to control the speed of the vehicle in a narrow range at and just below the preselected speed.

Now, if the driver wishes to activate the inventive cruise control mode, he presses the momentary contact switch 71, located conveniently within his reach, which applies voltage and current from the battery 89 to the conductive coil 65. It should be noted that the conductive coil 65, being connected at one end to the positive terminal 87 of the battery 89 and at the other end to the negative terminal 91 of the battery, must provide sufficient electrical resistance to prevent damage to the battery. The current flowing in the coil 65 creates a magnetic field of sufficient strength so that the linkage arm 49 is held bottomed in the piston rod 53, both the linkage arm and piston rod being surrounded by the coil 65. At the same time, the same magnetic field causes the two contacts 73 and 79 of the reed switch 75 to become electrically connected, so that current is maintained to the conductive coil 65 even when the driver releases the momentary contact switch 71.

The control unit 115 continues to monitor the vehicle speed, the position of the piston 59 (and thus the accelerator pedal 47) and the pressure in the chamber 99 to determine what pressure is to be supplied to the cylinder 61. If the vehicle exceeds the preset speed, the pressure in the cylinder 61 is increased and the piston 59 and the accelerator pedal 47 are moved in a direction opposite the force F. This causes the throttle cable 31 to move in a direction opposite the arrows 33 and reduces the proportion of fuel in the fuel-air mixture in the carburetor 29 and thus causes the engine 13 to run at a lower speed thus causing the automobile 10 to move at a slower velocity. On the other hand, if the vehicle speed drops below the preset speed, the control unit 115 causes the pressure supply unit to reduce the pressure in the cylinder 61, and the spring 93 urges the piston 59 and thus the linkage arm 49 and accelerator pedal 47 in the direction of the force F shown in FIG. 1, thus moving the throttle cable 31 in the direction of the arrow, causing a higher percentage of fuel in the fuel-air mixture in the carburetor 29 thus causing the engine 13 to run faster, allowing the automobile 10 to move at a higher velocity.

The spring 93 provides the force F that the operator's foot supplied in the conventional Deaccelerator, that is, a force great enough to overcome the force of the return spring (not shown) to depress the accelerator pedal 47 yet not so great as to override the pressure urging against pedal depression when the preset cruise speed is reached. However, the magnetic field caused by the current in the coil 65 is the means by which the force of the spring 93 is actuated. Because the spring 93 urges against the actuator piston 59, the magnetic field that holds the linkage arm 49 bottomed in the recess 51 of the piston rod 53 allows the spring to cause the accelerator pedal 47 to be depressed. Thus, the spring 93 and the magnetic field coact to replace the driver participation required in the conventional Deaccelerator cruise control operation.

The normally closed current switch 83 is held open by pressing on a brake pedal 137. This interrupts the current to the conductive coil 65, thereby interrupting the magnetic field and thus disengaging the linkage arm 49 and piston rod 53 and causing the contacts 73 and 79 of the reed switch to become disconnected. Thus, when the brake pedal 137 is released and the current switch 83 is closed again, no current is supplied to the coil 65 so that no magnetic field is created and therefore no engagement of the piston rod 53 and linkage arm 49 occurs. The conventional Deaccelerator function can then be resumed if the motorist again rests his or her foot on the accelerator pedal 47.

If the momentary contact switch 71 is pressed when the linkage arm 49 is not in contact with the piston rod 53, the magnetic field is not strong enough to force the piston rod to engage the linkage arm. Therefore, the linkage arm 49 must engage the piston rod 53 in the recess 51 before the inventive cruise control device may be employed. Because the piston rod 53 does not engage the linkage arm 49 in the conventional Deaccelerator system until the velocity of the automobile 10 reaches a value at or just below the preset value, the inventive cruise control device cannot be employed until the automobile is at or near the preset speed, a desirable safety feature.

Although a particular preferred embodiment of the invention has been disclosed in detail for illustrative o purposes, it will be recognized that variations or modifications of the disclosed apparatus, including the rearrangement of parts, lie within the scope of the present invention.

The embodiments of the invention in which an exclusive property or privilege is claimed are defined as follows:

1. A vehicle speed control unit for use in a vehicle having a variable speed engine, drive train means connecting said engine to a drive wheel therefor, a movable foot pedal movable against a normal amount of resistance, and throttle means on said engine responsive to movement of said foot pedal for increasing and decreasing engine speed and, consequently, vehicle speed, comprising:

a vehicle speed transducer means responsive to vehicle speed for generating a signal in response to vehicle speeds in excess of a predetermined speed;
  resistance means operatively responsive to said signal from said vehicle speed transducer means for effecting a sudden increase in a resistance force resisting movement of said foot pedal at a moment in time when said vehicle speed is at a specific value of said predetermined speed and a vehicle operator is applying a force to said movable foot pedal sufficient to overcome said normal amount of resistance to foot pedal movement but insufficient to overcome said increased resistance to foot pedal movement to cause said throttle means to produce a vehicle speed equal to said predetermined speed, said resistance force being sufficient to overcome said vehicle operator force to urge said foot pedal in a direction to cause said throttle means to reduce vehicle speed whenever said vehicle speed exceeds said specific value, said resistance means including an actuator piston supported for slidable reciprocal movement between first and second positions respectively spaced from and closely adjacent said foot pedal, and position control means for controlling the position of said actuator piston between said first and second positions in response to a range of vehicle speeds at and just slightly below said predetermined speed;
  piston engagement means provided on said foot pedal for engaging directly against said actuator piston when said actuator piston is in said second position closely adjacent said foot pedal; and
  coupling means cooperable with said actuator piston and said piston engagement means for selectively releasably coupling said actuator piston directly to said piston engagement means when said actuator piston is in said second position engaged against said piston engagement means and for transferring said reciprocal movement of said actuator piston to said foot pedal to increase and decrease the vehicle speed.

2. The vehicle speed control unit according to claim 1, wherein said vehicle speed transducer means includes a manually adjustable control means for rendering said predetermined speed a variable parameter variable between selectable values, and select means for facilitating selecting a specific value from said selectable values of said predetermined speed.

3. The vehicle speed control unit according to claim 1, wherein said piston control means includes means responsive to a vehicle speed below said predetermined speed for moving said actuator piston toward said first position while said actuator piston is coupled to said piston engagement means on said foot pedal so that said foot pedal is carried with said actuator piston for movement, without aid of said vehicle operator force, in a direction to cause said throttle means to increase said vehicle speed.

4. The vehicle speed control unit according to claim 3, wherein said coupling means includes magnetic means for causing said actuator piston and said piston engagement means to be securely magnetically engaged against each other.

5. A vehicle speed control unit for use in a vehicle having a variable speed engine and drive train means connecting said engine to a drive wheel therefor, a foot pedal movable in first and second directions, and throttle means responsive to movement of said foot pedal in said first direction for increasing a vehicle speed and responsive to movement of said foot pedal in said second direction for decreasing said vehicle speed, comprising:

a vehicle speed transducer means responsive to vehicle speed for generating a signal in response to vehicle speeds in excess of a predetermined speed;
  pedal moving means cooperable with said vehicle speed transducer means and said foot pedal for selectively moving said foot pedal in said first and second directions to control the position of said foot pedal when said vehicle speed is within a range of speeds at and just slightly below said predetermined speed, said pedal moving means including pedal engaging means responsive to a vehicle speed in excess of said predetermined speed and movable between respective positions spaced from a closely adjacent said foot pedal for selectively releasably engaging said foot pedal when closely adjacent thereto and carrying said foot pedal for movement therewith in said first and second directions;
  said pedal moving means further including means for causing said pedal engaging means to resist movement of said foot pedal in said first direction in response to vehicle speeds equal to and in excess of said predetermined speed and to disengage from said foot pedal in response to a vehicle speed below said predetermined speed, so that a force exerted by a weight of a vehicle operator's foot on said foot pedal at a vehicle speed below said predetermined speed causes movement of said foot pedal in said first direction to effect an increase in vehicle speed.

6. The vehicle speed control unit according to claim 5, wherein said pedal moving means includes means for moving said pedal engaging means in said first direction in response to a vehicle speed below said predetermined speed and while said foot pedal is engaged with said pedal engaging means so that said foot pedal is carried in said first direction without aid of said vehicle operator force to effect an increase in vehicle speed.

7. A vehicle speed control device for use in a vehicle having a variable speed engine and drive train means connecting said engine to a drive wheel therefor, a foot pedal movable in first and second directions and throttle means responsive to movement of said foot pedal in said first direction for increasing a vehicle speed and responsive to movement of said foot pedal in said second direction for decreasing said vehicle speed, comprising:
  a vehicle speed transducer means responsive to vehicle speed for generating a signal in response to vehicle speeds in excess of a predetermined speed, said vehicle speed transducer means including a manually adjustable control means for rendering said predetermined speed a variable parameter variable between selectable values;
  an actuator housing, said actuator housing having an actuator movable therein;
  coupling means for transferring a movement of said movable actuator to said foot pedal, said actuator being movable in said housing to effect movement of said foot pedal in said first and second directions; and
  regulating means responsive to said signal of said vehicle speed transducer means for regulating said vehicle speed within a range of speeds at and just below said predetermined speed, said regulating means including a first drive means responsive to said vehicle speed transducer means and vehicle speeds less than said predetermined speed for urging said actuator and linked foot pedal in said first direction, and a second drive means responsive to said vehicle speed transducer means and vehicle speeds in excess of said predetermined speed for urging said actuator and linked foot pedal in said second direction, said coupling means including a current source for supplying an electric current, a magnetizing means connected in circuit with said current source for generating a magnetic field, and switching means for controlling the supply of electric current to said magnetizing means, said switching means including a normally open momentary contact switch, a normally open magnetic field responsive switch, and means connected between said current source and a parallel combination of said normally open momentary contact switch and said normally open magnetic field responsive switch for selectively blocking the supply of said electric current to said magnetizing means and for selectively uncoupling said foot pedal from said actuator, said normally open magnetic field responsive switch being closed in response to a closing of said momentary contact switch and said magnetic field of said magnetizing means caused by said closing of said momentary contact switch to cause a continuance of said electric current to said magnetizing means following an opening of said momentary contact switch.

8. The vehicle speed control according to claim 7, wherein said means for selectively uncoupling said foot pedal from said actuator is a normally closed current switch.

9. The vehicle speed control according to claim 8, wherein said normally closed current switch is opened by operation of a brake pedal on said vehicle to effect an uncoupling of said foot pedal from said actuator.

* * * * *

UNITED STATES PATENT AND TRADEMARK OFFICE
CERTIFICATE OF CORRECTION

PATENT NO. : 4 947 950

DATED : August 14, 1990

INVENTOR(S) : Richard P. HEINTZ

It is certified that error appears in the above-identified patent and that said Letters Patent is hereby corrected as shown below:

Column 10, line 11; change "piston" to ---position---.

Signed and Sealed this

Seventeenth Day of March, 1992

Attest:

HARRY F. MANBECK, JR.

*Attesting Officer*     *Commissioner of Patents and Trademarks*